May 27, 1958   L. E. MATTHEWS   2,836,378
SERVOMECHANISM
Filed Feb. 29, 1956
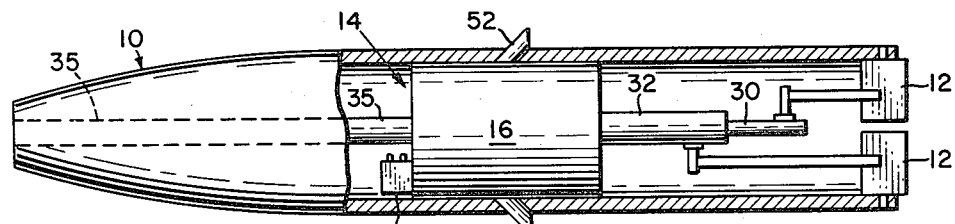
Fig. 1
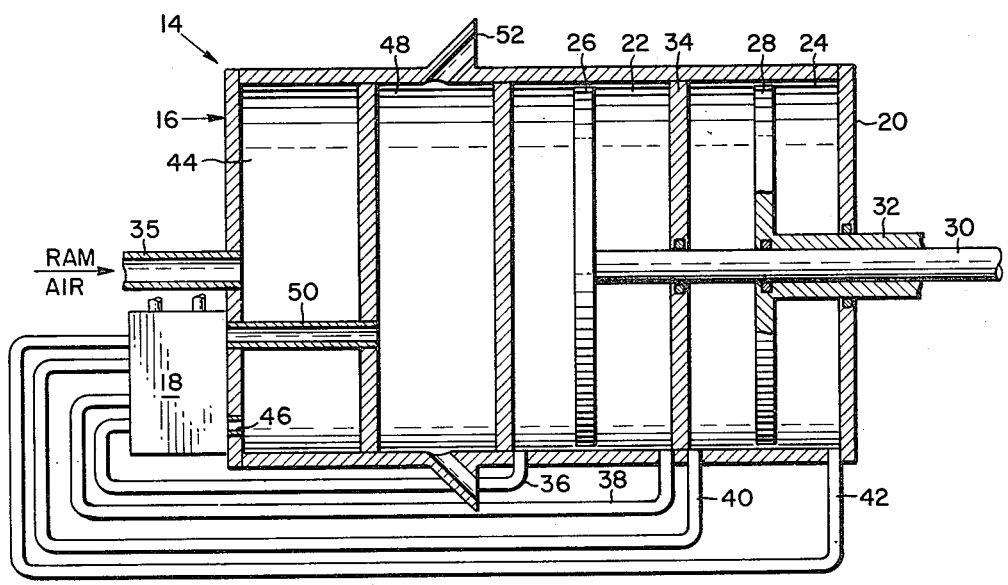
Fig. 2
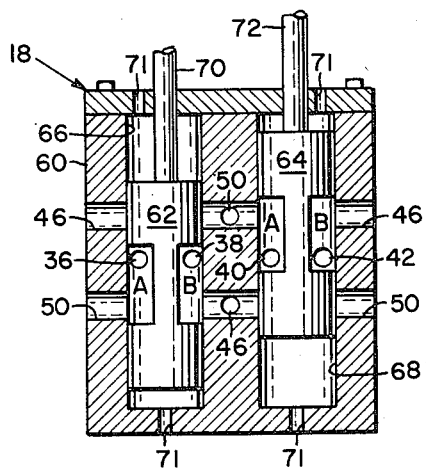
Fig. 3
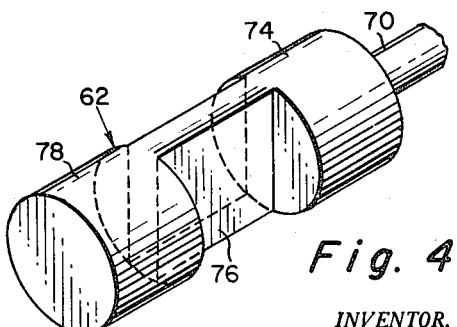
Fig. 4
*INVENTOR.*
LYLE E. MATTHEWS
BY
*ATTORNEYS*

United States Patent Office 2,836,378
Patented May 27, 1958

2,836,378

SERVOMECHANISM

Lyle E. Matthews, Oxnard, Calif.

Application February 29, 1956, Serial No. 568,687

4 Claims. (Cl. 244—14)

(Granted under Title 35, U. S. Code (1952), sec. 266)

The invention described herein may be manufactured and used by or for the Government of the United States of America for governmental purposes without the payment of any royalities thereon or therefor.

This invention relates to servomechanisms and more particularly to a servomechanism capable of utilizing ram air induced in flight to actuate the control surfaces of an aircraft.

Present day aircraft, particularly guided missiles, for the most part rely on hydraulic systems to actuate the missile control surfaces in accordance with predetermined guidance signals. Hydraulic actuators present an important characteristic, namely, they can produce large and positive forces capable of moving control surfaces having high hinge moments. However, there are inherent disadvantages in these actuators in that they rely on a large hydraulic accumulator which necessarily contains a limited supply of pressurized actuator fluid. Obviously, depletion of the hydraulic oil or the charging medium results in a loss of power, and a consequent loss of missile control. This is an important factor that can limit missile range. Another serious limitation of hydraulic actuators is the weight of both the hydraulic fluid, usually oil, and components, particularly the accumulator which must be of sufficient strength to withstand the extremely high precharge pressure. In fact, a substantial portion of the weight of many missiles resides in the weight of the hydraulic components.

According to the present invention, a servomechanism is provided that is capable of being powered by ram air created by an aircraft in flight. Servomechanisms of this type have an inherent limitation in the output that can be developed and therefore are particularly suitable for actuating aircraft control surfaces having low hinge moments, such as "jetavators," a term presently being used to describe control surfaces which are mounted adjacent the exhaust opening of jet aircraft and operable to steer the aircraft by deflecting the jet stream.

In a preferred embodiment the servomechanism is employed to actuate the "jetavator" control surfaces of a jet aircraft. The servomechanism comprises a servomotor having a plurality of pistons, one piston designated to actuate a specified control surface. The pistons are operable independently to steer the aircraft through the control surfaces along any flight path in accordance with predetermined guidance signals. Atmospheric ram air created by the missile in flight is ported through a control valve to both sides of each piston, while the opposite sides of the corresponding pistons are simultaneously vented. A ram air accumulator may be used to provide an adequate supply of available ram air pressure which ensures smoother operation of the controls. Likewise, the piston cylinders may be vented through a vacuum accumulator having an outlet to the atmosphere for supplying a negative pressure.

A principal object of this invention is to provide a servomechanism operable by ram air pressure which is capable of actuating the control surfaces of an aircraft.

Another object is to provide a ram air servomechanism which will provide an adequate supply of ram air pressure to ensure smooth operation of the aircraft controls.

Further objects are to provide a ram air servomechanism which is highly reliable, compact, simple, and of light weight in construction.

Other objects and many of the attendant advantages of this invention will be readily appreciated as the same becomes better understood by reference to the following detailed description when considered in connection with the accompanying drawings wherein:

Fig. 1 is a diagrammatic elevation view of a jet aircraft, partly in section, showing the ram air servomechanism of this invention connected to the control surfaces thereof;

Fig. 2 is an enlarged longitudinal section of the ram air servomotor;

Fig. 3 is a cross-sectional view of the control valve; and

Fig. 4 is a perspective view of one of the spool valves of the control valve.

Referring now to the drawings wherein like reference characters designate like or corresponding parts throughout the several views, there is shown generally in Fig. 1 a conventional jet powered aircraft or missile 10 having control surfaces 12 of the type sometimes called "jetavators" being located adjacent the jet nozzle to direct the aircraft flight along a predetermined flight path by deflecting the jet discharge. The servomechanism of this invention is shown generally by the reference numeral 14 and depends on ram air pressure generated by the aircraft in flight to actuate the control surfaces 12 in accordance with signals from a guidance system, not shown. While the servomechanism is particularly suitable for use with control surfaces that require small hinge moments, it is understood that the invention is not limited to the particular type of aircraft or control surfaces illustrated.

Referring to Fig. 2, servomechanism 14 comprises generally a ram air servomotor 16 and a control valve 18 for admitting and exhausting air pressure to servomotor 16 in a predetermined sequence to obtain the desired aircraft control.

Servomotor 16 comprises a cylinder housing 20 having a plurality of cylinders 22 and 24 each containing a double acting piston 26 and 28 having piston rods 30 and 32, respectively. Each piston rod is connected through suitable linkage to one of independently operable control surfaces 12. It is readily understood that the same number of cylinders and associated pistons are employed as are control surfaces, and, if more than two control surfaces as illustrated are required in any particular missile construction, additional cylinders and pistons can be provided. Cylinders 22 and 24 are preferably positioned in the aft end of housing 20 in juxtaposition with a common partition wall 34 to reduce piston rod length to a minimum, and, in addition piston rods 30 and 32 are of a telescopic construction permitting independent operation of both rods from the aft end of the housing.

Atmospheric ram air is admitted to both sides of pistons 26 and 28 from an air intake 35 via control valve 18 and through two pair of pipes 36, 38 and 40, 42, respectively. When ram air is admitted to one side of each piston by one pipe, the opposite side of the piston is exhausted by the other pipe of the pair through valve body 18. The details of control valve 18 will be presently described with reference to Figs. 3 and 4. Air intake 35 can be connected to the missile exterior in any suitable manner depending on the particular aircraft configuration and propulsion system.

To enable smoother operation of aircraft controls, ram air from intake 35 is first introduced into an air accumulator 44 and thence to control valve 18 via port 46 before being distributed to the servomotor in accordance with the guidance signals. A similar provision can be made for servomotor exhaust by a vacuum accumulator 48 connected to control valve 18 by pipe 50. Accumulator 48 is connected to the atmosphere by vents 52 which preferably extend beyond the surface of the missile skin so as to produce a wake, and an ensuing vacuum. As a matter of design, cylinders 22 and 24 and accumulators 44 and 48 are arranged as an integral construction with the various parts laterally disposed, providing a structure particularly suitable for aircraft configuration. It is estimated that ram air pressure in accumulator 44 will amount to about a positive 2 p. s. i. g. while the negative pressure in vacuum accumulator 48 will amount to about a negative 2 p. s. i. g., or a total differential pressure of approximately 4 p. s. i. g. being available to drive the controls. Since this pressure will not be available until the aircraft achieves operating speed some provision may be provided in such aircraft for maintaining the controls in neutral or in any other desired position in the boost phase until the missile attains speed and the guidance system is ready to assume command. This auxiliary control is probably unnecessary in an air-to-air guided missile having available ram air before being launched from a mother aircraft.

The details of control valve 18 are illustrated in Figs. 3 and 4, and comprises a valve housing 60 having a pair of valve spools 62 and 64 reciprocably disposed in cylinders 66 and 68, respectively. Valve 62 functions to control the admission and exhaust of air to the sides of piston 26 of the servomotor, and valve 64 serves to control the admission and exhaust of air to the sides of piston 28.

Valve spools 62 and 64 are provided with control rods 70 and 72 which are reciprocably driven by a suitable prime mover, not shown, being regulated by the guidance signals from a progressive or on/off type of guidance system. As valve spools 62 and 64 are identical in construction, the description of valve spool 62 should suffice for both spools. Valve spool 62 composes a pair of spaced cylindrical land portions 74 and 78 connected by a flat partition wall 76 forming with the respective cylinder two chambers A and B. In valve 62, chamber A is connected by an outlet port to pipe 36 and chamber B is connected by an outlet port to pipe 38, while in valve 64, chamber A is connected by an outlet port to pipe 40 and chamber B is connected by an outlet port to pipe 42. Suitable means are provided for guiding valve spools 62 and 64 in a rectilinear movement without rotation to avoid any change in the relationship between the chambers and the respective ports.

As shown in Fig. 2, ram air pressure from accumulator 44 is admitted to valve 18 through pipe 46 and is equally distributed by means of a manifold, not shown, via three branch pipes 46 as shown in Fig. 3; and, similarly, a negative pressure from accumulator 48 in line 50 is distributed by a second manifold, not shown, to three branch pipes 50. Each land portion of valves 62 and 64 controls the admission and exhaust of air pressure of one pair of branch pipes 46 and 50 through a valve chamber to the respective servomotor pistons. Any air pressure leakage past valve spools 62 and 64 to both ends of cylinders 66 and 68 is exhausted by means of vent ports 71.

Operation of the ram air servomechanism commences when the aircraft reaches a sufficient velocity to generate a ram air pressure, which in most instances will occur probably during the boost phase. In other instances, such as air-to-air guided missiles, ram air is available at launching. Assume for this description that a pitch guidance signal is received by the aircraft to vary the flight path, and that piston 26 is connected to the surface control 12 that will provide this desired change. To affect this change valve spool 62 is moved downward to the position illustrated in Fig. 3 so that land 74 blocks the upper pair of inlet pipes 46 and 50 while land 78 uncovers a lower pair of inlet pipes 46 and 50, simultaneously connecting negative air pressure in pipe 50 to chamber A and outlet port 36, and admitting positive air pressure in pipe 46 to chamber B and pipe 38. Admitting pressure to the right side of piston 26 via pipe 38 and simultaneously exhausting the left side of the piston through pipe 36 will cause the piston to move to the left actuating the corresponding control surface 12 to the extent commanded by the guidance signal. If an opposite pitch direction is commanded, movement of valve 62 upward will reverse the flow to and movement of piston 26 by connecting chamber A and pipe 36 to positive air pressure in line 46 and connecting chamber B and pipe 38 to vacuum in line 50. The foregoing operation is the same for piston 28 and its associated control surface, but is independent thereof being controlled by the corresponding command signal.

The servomechanism of this invention provides an inexhaustable power supply for controlling aircraft steering controls as long as the aircraft is in motion. As a consequence, aircraft range is not dependent on a limited power source. In addition, overall weight of an aircraft can be decreased by eliminating the need for large pressure tanks heretofore required and avoiding the other disadvantages of a precharged actuator system.

Obviously many modifications and variations of the present invention are possible in the light of the above teachings. It is therefore to be understood that within the scope of the appended claims the invention may be practiced otherwise than as specifically described.

I claim:

1. In a guided missile having at least two direction control members for steering the missile along a flight path in accordance with guidance signals, a servomechanism for driving the control members comprising at least two independent cylinders, a piston disposed in each cylinder and adapted to be operatively connected to a corresponding control member, means for admitting ram air to one side of said pistons, means for exhausting to atmosphere the other side of each piston, and a valve device for selectively controlling the admission and exhaust of air to the respective sides of the pistons to move said control members and to steer the missile along the predetermined flight path.

2. The mechanism of claim 1 wherein said means include a ram air accumulator and a negative air pressure accumulator respectively.

3. In a guided missile having at least two direction control members for steering the missile along a flight path in accordance with guidance signals, a servomechanism for driving the control members comprising a compartment formed into two independent cylinders arranged in tandem and having a common fixed partition wall, a piston disposed in each cylinder and adapted to be operatively connected to a corresponding control member, means for admitting ram air to one side of said pistons, means for exhausting the other side of each piston to the atmosphere, and valve means for controlling the admission and exhaust of air to the respective sides of the pistons to actuate said control members for steering the missile along the predetermined flight path.

4. In a jet guided missile having at least two direction control members movable in the jet exhaust for steering the missile along a flight path in accordance with guidance signals, a servomechanism for driving the control members comprising a plurality of compartments arranged in tandem along the longitudinal axis of the missile, at least two of said compartments being in contiguous relation and provided with a common fixed wall, a piston disposed in each cylinder and adapted to be operatively connected to a corresponding control member, another of said compartments being a ram air pressure accumulator having a ram air intake, another of said compartments being a vacuum pressure accumulator having an exhaust outlet to atmosphere, fluid conducting means for connecting the accumulators to the sides of said pistons, and valve means for selectively controlling the admission and exhaust to opposite sides of each piston to actuate said control members for steering the missile along the predetermined flight path.

References Cited in the file of this patent

UNITED STATES PATENTS

| | | |
|---|---|---|
| 2,458,900 | Erny | Jan. 11, 1949 |
| 2,559,817 | Ashkenas | July 10, 1951 |